3,409,559
METHOD OF PREPARING A SLURRY COATING COMPOSITION
Burton A. Benson, Evanston, Ill., assignor to The Rauland Corporation, Chicago, Ill., a corporation of Illinois
No Drawing. Filed June 30, 1965, Ser. No. 468,628
3 Claims. (Cl. 252—301.3)

ABSTRACT OF THE DISCLOSURE

A slurry for screening a color cathode-ray tube is prepared by charging a ball-mill with a mixture of desired quantities of a phosphor, ammonium dichromate as a sensitizer and water. To this is also added a binder such as polyvinyl alcohol and the mixture is ball-milled for approximately 12 hours. The material taken from the mill is then mixed with further amounts of polyvinyl alcohol and water to obtain a slurry of desired viscosity.

---

The present invention is directed to a method of preparing a sensitized slurry coating composition for use in screening the image area of a color cathode-ray tube.

The slurry screening of a color cathode-ray tube is now well known in the art and is in commercial practice. It involves covering the whole image area of the tube with a slurry coating composition which comprises phosphor particles suspended in a resinous solution which has been sensitized to the end that its solubility in a particular solvent is a function of its exposure to actinic light. The screen or image area with such a slurry coating is exposed in a chamber or lighthouse to actinic energy by projecting that energy onto the coating through the parallax barrier or shadow mask of the tube. As a consequence, certain elemental areas of the coating are exposed but others are not. If the coating is of the negative acting type, and this is most common, the exposed areas are rendered insoluble whereas the unexposed areas retain their solubility in the solvent of the coating composition. Accordingly, washing the image area with the solvent develops the image resulting from exposure of the screen through the parallax mask. If the mask has a pattern of circular apertures, the developed image is a corresponding multiplicity of phosphor dots of a particular color. This same general process is carried out three times, once for each of the three primary phosphor colors. The final screen pattern is the now familiar field of dots triads with the three dots of each triad representing phosphor of the three primary colors.

Positive acting photosensitive resists are also known and may be employed in essentially the same way as the negative acting type although the influence of actinic light on positive resists is to render the exposed areas soluble while the unexposed areas are insoluble.

It is an object of the present invention to improve the process of preparing the slurry composition for use in screening a color tube.

It is a specific object of the invention to provide a method of slurry preparation which improves the density of the phosphor dots.

It is another specific object of the invention to provide a process of slurry preparation which enhances the adherence, density and light sensitivity of the phosphor dats.

The method of the invention for preparing a sensitized slurry coating composition for screening the image area of a color cathode-ray tube comprises ball-milling for a predetermined time a mixture of a resinous binder, a solvent for the binder and a sensitizer. After ball-milling has been completed, additional quantities of the binder and its solvent may be added to form a slurry of a predetermined viscosity.

Preferably, the sensitizing agent is added as an ingredient of the charge for the ball-mill although, if desired, the resinous binder and the sensitizing agent may be pre-mixed.

The features of the present invention which are believed to be novel are set forth with particularity in the appended claims. The invention together with further objects and advantages thereof may best be understood by reference to the following description.

As indicated, the subject invention concerns the method of preparing a sensitized slurry coating composition and as used herein that expression is intended to define a composition including a resinous binder which has the property that its solubility in a particular solvent is proportional to, or may be charged under the influence of, actinic energy. Resinous binders such as polyvinyl alcohol exhibit this property when treated with a sensitizing agent and such a sensitized binder may serve as a vehicle for suspending phosphor particles used in slurry screening the image of a color cathode-ray tube.

In practicing the invention, the polyvinyl alcohol or whatever resinous binder may have been selected, its solvent and a sensitizing agent that is compatible with the binder and the solvent are added in preselected amounts as a charge for a ball-mill. An illustrative formulation is as follows:

275 grams of phosphor
167 grams of 10% solution of polyvinyl alcohol in water
22 cc. of water
75 cc. of a 10% solution of ammonium dichromate in water The phosphor, ammonium dichromate and water are preferably mixed together and the polyvinyl alcohol solution is added to this mixture.

This formulation is useful in screening a 21-inch round color television tube and the charge is milled for approximately 12 hours. After the milling has been accomplished, there is added further amounts of polyvinyl alcohol in water to attain a slurry of a desired viscosity. For example, one may add to the illustrative formulation 306 cc. of water and 265 grams of 10 percent polyvinyl alcohol solution.

The resulting slurry coating composition is especially beneficial for screening the image area of a color cathode-ray tube by the process described above. It found that in milling with the sensitizing agent in the mill charge, as described, the sensitizer is able to penetrate the binder solution and the shell or coating formed on the phosphor particles as a result of the mixing action and the physical pressure of milling is a shell of sensitized binder. This is in distinct contrast with prior practices of the art in which the sensitizing agent is added after ball-milling wherein the phosphor particles are encased or coated with unsensitized binder. By having the coating or shell sensitized, as accomplished in the described process of slurry preparation, the slurry exhibits much greater adherence to the glass substrate constituting the image area of the tube. Because of the improved adherence there is increased phosphor density of the dots with attendant advantages in reduction of cross contamination and better brightness. Moreover, there may be a reduction in the exposure time required to develop the phosphor image.

The sensitizing agent may be mixed with the resinous binder in advance of milling to permit the sensitizer to enter into solution with the binder. The admixture of the binder and sensitizer are then used along with a quantity of phosphor in charging the mill.

Another improved process of slurry preparation, which features adsorbing a sensitizing agent on the surface of the phosphor particles prior to charging the ball-mill as distinguished from adding the sensitizer into the charge of the mill, is the subject of a concurrently filed application of Irwin Kachel, S.N. 468,590, assigned to the assignee of the present invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. The method of preparing a sensitized slurry coating composition for screening the image area of a color cathode-ray tube which comprises:

charging the ball-mill with predetermined quantities of a phosphor, a resinous binder, a solvent for said binder and a sensitizer;

ball-milling this mixture for a given period of time; and adding additional quantities of said binder and said solvent after the ball-milling to form a slurry of a predetermined viscosity.

2. The method of preparing a sensitized slurry coating composition for screening the image area of a color cathode-ray tube which comprises:

charging a ball-mill with predetermined quantities of a phosphor, polyvinyl alcohol, water and ammonium dichromate and ball-milling this mixture for a given period of time;

and adding additional quantities of polyvinyl alcohol and water after the ball-milling to form a slurry of a predetermined viscosity.

3. The method of preparing a sensitized slurry coating composition for screening the image area of a color cathode-ray tube which comprises:

mixing pretermined amounts of a resinous binder and a sensitizer;

charging a ball-mill with the mixture of binder and sensitizer and also with predetermined amounts of a phosphor and a solvent for said binder and ball-milling this mixture for a given period of time;

and adding an additional quantity of said solvent after the ball-milling to form a slurry of a predetermined viscosity.

References Cited

UNITED STATES PATENTS 3,097,103    7/1963    Homer et al. _____ 252—301.3
2,840,470    6/1958    Levine _____ 96—118

TOBIAS E. LEVOW, *Primary Examiner.*

R. D. EDMONDS, *Assistant Examiner.*